US011083968B2

(12) United States Patent
Walker et al.

(10) Patent No.: US 11,083,968 B2
(45) Date of Patent: Aug. 10, 2021

(54) METHOD FOR CREATING A VIRTUAL OBJECT

(71) Applicant: LEGO A/S, Billund (DK)

(72) Inventors: Morgan James Walker, Aarhus (DK); Jonathan B. Bennink, Aarhus (DK); Henrik Munk Storm, Randbøl (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 16/309,408

(22) PCT Filed: Jul. 4, 2017

(86) PCT No.: PCT/EP2017/066566
§ 371 (c)(1),
(2) Date: Dec. 12, 2018

(87) PCT Pub. No.: WO2018/007351
PCT Pub. Date: Jan. 11, 2018

(65) Prior Publication Data
US 2019/0240580 A1 Aug. 8, 2019

(30) Foreign Application Priority Data

Jul. 5, 2016 (DK) .............................. PA201670492

(51) Int. Cl.
A63F 13/00 (2014.01)
A63F 13/65 (2014.01)
(Continued)

(52) U.S. Cl.
CPC ............ A63F 13/65 (2014.09); A63F 13/213 (2014.09); A63F 13/63 (2014.09); G06T 19/003 (2013.01);
(Continued)

(58) Field of Classification Search
None
See application file for complete search history.

(56) References Cited

U.S. PATENT DOCUMENTS 5,815,147 A * 9/1998 Bogen .................. A63F 13/005
715/835
6,259,815 B1 7/2001 Anderson et al.
(Continued)

FOREIGN PATENT DOCUMENTS

GB 2532075 A 5/2016
WO 2004/034333 A1 4/2004
(Continued)

OTHER PUBLICATIONS

International Search Report, issued in corresponding international application No. PCT/EP2017/066566, dated Nov. 21, 2017.
(Continued)

Primary Examiner — Paul A D'Agostino
(74) Attorney, Agent, or Firm — Day Pitney LLP; Valeriya Svystun

(57) ABSTRACT

A computer-implemented method for creating a virtual object; the method comprising: receiving a digital representation of a visual appearance of a real-world object; creating a virtual object with a visual appearance based on the received digital representation; selecting a part of the virtual object; and assigning one or more attributes to the selected part of the virtual object.

17 Claims, 8 Drawing Sheets

(51) Int. Cl.
*A63F 13/213* (2014.01)
*A63F 13/63* (2014.01)
*G06T 19/00* (2011.01)
*G06T 19/20* (2011.01)
*A63F 13/533* (2014.01)

(52) U.S. Cl.
CPC .......... *G06T 19/20* (2013.01); *A63F 13/533* (2014.09); *A63F 2300/6018* (2013.01); *A63F 2300/69* (2013.01)

(56) References Cited

U.S. PATENT DOCUMENTS

| | | | |
|---|---|---|---|
| 6,290,565 B1* | 9/2001 | Galyean, III | A63H 3/16 273/148 B |
| 7,397,464 B1 | 7/2008 | Robbins et al. | |
| 7,439,972 B2 | 10/2008 | Timcenko | |
| 7,596,473 B2 | 9/2009 | Hansen et al. | |
| 8,023,724 B2 | 9/2011 | Barbour | |
| 8,128,500 B1 | 3/2012 | Borst et al. | |
| 9,229,528 B2 | 1/2016 | Numaguchi et al. | |
| 9,409,084 B2 | 8/2016 | Horovitz et al. | |
| 9,555,326 B2 | 1/2017 | Scott et al. | |
| 9,595,108 B2 | 3/2017 | Horovitz et al. | |
| 10,089,772 B2* | 10/2018 | Taylor | G06T 13/40 |
| 10,252,178 B2* | 4/2019 | Reid | A63H 3/50 |
| 2002/0196250 A1 | 12/2002 | Anderson et al. | |
| 2005/0093874 A1* | 5/2005 | Levene | G06T 15/04 345/582 |
| 2005/0128212 A1* | 6/2005 | Edecker | G06T 15/04 345/582 |
| 2009/0066690 A1 | 3/2009 | Harrison | |
| 2009/0271436 A1* | 10/2009 | Reisinger | G06F 30/20 |
| 2010/0146085 A1* | 6/2010 | Van Wie | H04L 67/1059 709/220 |
| 2011/0032255 A1* | 2/2011 | Favier | G06T 13/20 345/420 |
| 2011/0086702 A1* | 4/2011 | Borst | A63F 13/533 463/30 |
| 2011/0298922 A1 | 12/2011 | Horovitz et al. | |
| 2012/0069051 A1 | 3/2012 | Hagbi et al. | |
| 2012/0295703 A1 | 11/2012 | Reiche et al. | |
| 2012/0306853 A1 | 12/2012 | Wright et al. | |
| 2013/0052907 A1* | 2/2013 | Pedersen | G09B 11/00 446/146 |
| 2014/0028712 A1* | 1/2014 | Keating | G06T 7/246 345/633 |
| 2014/0253540 A1 | 9/2014 | Dori et al. | |
| 2014/0273717 A1 | 9/2014 | Judkins et al. | |
| 2015/0058229 A1* | 2/2015 | Wiacek | H04L 67/02 705/310 |
| 2015/0355805 A1* | 12/2015 | Chandler | G06F 3/04842 715/784 |
| 2015/0356779 A1* | 12/2015 | Osterhout | H04L 51/20 345/633 |
| 2016/0189493 A1 | 6/2016 | Rihn | |
| 2017/0189797 A1 | 7/2017 | Muthyala et al. | |

FOREIGN PATENT DOCUMENTS

| | | |
|---|---|---|
| WO | 2008065458 A2 | 6/2008 |
| WO | 2010025559 A1 | 3/2010 |
| WO | 2011/017393 A1 | 2/2011 |
| WO | 2015/185629 A2 | 12/2015 |
| WO | 2016/050757 A1 | 4/2016 |
| WO | 2016/075081 A1 | 5/2016 |
| WO | 2016075081 A1 | 5/2016 |

OTHER PUBLICATIONS

Written Opinion of the International Searching Authority, issued in corresponding international application No. PCT/EP2017/066566, dated Nov. 21, 2017.
Notification and International Preliminary Report on Patentability accompanied with Annexes (7 Sheets), issued in corresponding international application No. PCT/EP2017/066566, dated Aug. 30, 2018.
Ma et al., "Rapid Acquisition of Specular and Diffuse Normal Maps from Polarized Spherical Gradient Illumination", Eurographics Symposium on Rendering, The Eurographics Association 2007. (12 pages).
International Search Report issued in related international application No. PCT/EP2017/066598, dated Nov. 21, 2017.
Written Opinion of the International Search Authority in related international application No. PCT/EP2017/066598, dated Nov. 21, 2017.
Danish PTO Search Report issued in related patent application No. PA 2017 70277, dated Jul. 5, 2017.
Danish PTO Search Report issued in priority patent application No. PA 2016 70492, dated Feb. 3, 2017.

* cited by examiner

METHOD FOR CREATING A VIRTUAL OBJECT

CROSS-REFERENCE TO RELATED APPLICATIONS

This application is a U.S. National Stage of International Application No. PCT/EP2017/066566, filed on 4 Jul. 2017 and published on 11 Jan. 2018, as WO 2018/007351 A1, which claims the benefit of priority to Danish Patent Application No. DK PA201670492, filed on 5 Jul. 2016. The content of each of the above referenced patent applications is incorporated herein by reference in its entirety for any purpose whatsoever.

FIELD OF THE INVENTION

The invention relates to a computer-implemented method of creating a virtual object based on a digital representation of a real-world object, such as a toy construction model constructed from toy construction elements of a toy construction system.

BACKGROUND

Toy construction systems have been known for decades. Over the years, simple box-shaped building blocks have been supplemented with other construction elements with either a specific appearance or a mechanical or electrical function to enhance the play value. Such functions include e.g. motors, switches and lamps, but also programmable processors that accept input from sensors and can activate function elements in response to received sensor inputs.

Several attempts have been made to control virtual game play by means of real-world, physical toys.

For example, US 2011/298922 discloses a system for extracting an image of a physical object. The extracted image can be digitally represented on a display device as part of a virtual world, or video game, where the objects inhibiting the virtual world and/or video game, were designed and built from the construction set in the real-world. However, in many video games or other virtual environments it is desirable to provide three-dimensional virtual objects that experience a rich behaviour.

According to at least one aspect, it is thus desirable to provide a process for creating three-dimensional virtual objects that exhibit a rich functional behaviour from real-world objects in a user-friendly manner. In particular, it is desirable to provide such a method in which the user is not required to go through a large number of steps to configure and modify the resulting virtual object, e.g. where the creation of the virtual object is performed in at least a partly automated fashion, requiring only little user interaction.

WO 2015/185629 discloses a toy construction system comprising a plurality of toy construction elements and an image capturing device operable to capture one or more images of a toy construction model constructed from one or more of said toy construction elements. This prior art system further comprises a processor configured to determine one or more visual attribute parameters indicative of a respective visual attribute derivable from one or more of a color, a shape and a size of the toy construction model. The processor is further configured to create a virtual object in a computer-generated virtual environment, and to control the virtual object in the computer-generated virtual environment to have a behaviour based on the determined one or more visual attribute parameters.

According to at least one aspect, it is desirable to provide a method and system that allow three-dimensional virtual objects to be created from real-world objects, such as from real-world toy construction models, in a user-friendly, yet reliable and accurate manner. In particular, it is desirable to provide methods and systems that are easy to use and that provide 3D representations of virtual objects that have a high degree of functionality in a virtual environment such as in a video game. It is also desirable to provide virtual objects that accurately represent the 3D shape of a corresponding real-world object.

It is generally desirable to provide a toy construction system that enhances the educational and/or play value of the system. It is also desirable to provide a toy construction system wherein a set of construction elements may easily be used in different toy construction models and/or in combination with existing toy construction elements. Moreover it is desirable to provide a toy construction system that allows users, in particular children, to construct multiple toy models in a user-friendly, efficient, yet flexible and reliable manner. In particular, it is desirable to provide a toy construction system that allows a user-friendly and flexible manner of creating virtual objects in a virtual environment such as a game system.

Various aspects of the invention disclosed herein may address at least some of the disadvantages of prior art systems.

SUMMARY

According to a first aspect, disclosed herein is a computer-implemented method for creating a virtual object; the method comprising:
  obtaining a digital representation of a visual appearance of a real-world object;
  creating a virtual object based on the received digital representation;
  selecting a part of the virtual object; and
  assigning one or more attributes to the selected part of the virtual object.

Consequently, one or more captured images of the real-world object, or another form of digital representation of the visual appearance of the real-world object, may be used by a processor executing the method as a basis for generating a virtual object having a user-defined appearance and attributes in a virtual environment. For example, a user may create a real-world toy construction model or otherwise select or create a real-world object resembling an asset to be used as a virtual object in a computer-generated virtual environment. The method provides the user with a flexible, yet easy-to understand and easy-to use mechanism for influencing the desired appearance of the virtual object in the virtual environment.

In particular, virtual objects with rich functional behaviour may be created when attributes are assigned to individual parts of the virtual object. An attribute may thus be associated with a location relative to the 3D representation of the virtual object, e.g. a location on a surface of the virtual object. For example, the process may create functional elements of a virtual object such as movable parts, parts that can be user-controlled, parts that can change appearance, parts that can interact with other virtual objects or with the virtual environment, etc. or that have other forms of functional attributes associated with them.

As the user may construct these objects from toy construction elements, the user has a large degree of freedom as to how the object is constructed.

The digital representation of the visual appearance of the real-world object may be a suitable representation indicative of a three-dimensional shape of the real-world object. In particular, the digital representation may represent a point cloud and/or a surface geometry of the real-world object. The digital representation may further include information of visible properties of the real-world object, e.g. one or more colors, surface texture, and/or the like. For example, the digital representation may be a surface representation, e.g. in the form of a 3D mesh, or a volume representation, e.g. a voxel-based representation, of the real-world object.

The process may receive the digital representation or create the digital representation from suitable input data, e.g. from data received from one or more sensor devices operable to capture radiation from the real-world object. A sensor device may comprise one or more sensors that detect light or other forms of electromagnetic radiation, such as light or other electromagnetic radiation reflected by surfaces of a real-world object in a field of view of the sensor device. The sensor device may comprise an array of sensors, such as a CCD chip, or a single sensor that is operable to scan across a field of view, or a combination of a number of sensors that are scanned. Hence, the real-world object may be passive in that it does not need to actively emit any sound, light, radio-signals, electrical signals, or the like. Moreover, the sensor device may be operable to capture radiation in a contactless fashion without the establishment of any electrical contact, communications interface or the like between the sensor device and the real-world object.

In some embodiments, the sensor device comprises an image capture device operable to capture two or more images of the real-world object when the real-world object is placed within a field of view of the image capture device, e.g. on a suitable object support, wherein the two or more images are taken from different viewpoints relative to the real-world object. Each image may be a picture or another form of two-dimensional representation of a field of view of the image capturing device which representation allows the determination of a shape and/or color and/or size of an object within the field of view. The image may comprise a 2D array of pixels or other array elements, each array element representing sensed information associated with a point or direction within the field of view. The sensed information may include an intensity of a received radiation or wave, a frequency/wavelength of the received radiation or wave, a distance map, a polarisation map, a map of surface normal, and/or other suitable sensed quantity.

Accordingly, the image capture device may comprise one or more digital cameras responsive to visible light, to infrared light, and/or the like. For example, the image capture device may comprise two digital cameras adapted at respective viewpoints relative to the object support, e.g. at respective elevations relative to the object support. The image capture device may comprise one or more depth cameras operable to also detect distance information of respective points within the field of view relative to the camera position. Some embodiments of a sensor device may comprise a laser. In some embodiments, the image capture device is configured to capture depth information in addition to light intensity data (such as RGB data). In some embodiments, the image capture device is configured to capture information indicative of surface normals of one or more surfaces within a field of view of the digital camera. For example, an image capture device may be configured to obtain polarisation data of the received light. The image capture device and/or the processor may be configured to determine local surface normals from the obtained polarisation data. The captured surface normals may also be transformed into a world coordinate system based on the detected tilt or other displacements of the turntable relative to the camera. Examples of camera sensors that are capable of detecting surface normals include the system disclosed in U.S. Pat. No. 8,023,724. Other examples of techniques for determining surface normal include the techniques described in "Rapid Acquisition of Specular and Diffuse Normal Maps from Polarized Spherical Gradient Illumination" by Wan-Cun Ma et al., Eurographics Symposium on Rendering (2007), Jan Kautz and Sumanta Pattanaik (Editors). The sensor device may output analogue or digital signals indicative of the captured radiation, e.g. of one or more captured images, e.g. as digital images or other data maps, as a video stream, and/or the like.

The process for creating the digital representation may include multiple stages of a multi-stage process for creating a 3D digital representation based on the captured radiation, e.g. based on captured images. In some embodiments, the process uses a suitable scheme for sensor pose estimation, e.g. based on a non-repeating colored pattern arranged on a turntable on which the real-world object is placed. The colored pattern may then be image-processed macroscopically and/or through a distance-to-edge measurement. Other embodiments may use markers.

Accordingly, the process may comprise creating a 3D digital representation from light intensity data and/or from other sensed data, such as depth data, e.g. in the form of one or more depth maps, from polarisation data and/or surface normal data or a combination thereof. The process may use structure from motion techniques, space carving techniques or other suitable techniques. If the sensor provides a field of detected surface normal, these may be used to detect marker features, e.g. edges or corners or other features with abrupt changes in surface normal directions, for use in a structure from motion process. In other embodiments the detected surface normal may be used to transform a voxel representation of the object (e.g. as obtained by a space carving process) into an accurate surface mesh.

Generally, the 3D digital representation may include any suitable type of representation, e.g. a surface mesh of polygons, a voxel representation, etc. or a combination thereof.

The process creates a virtual object and associates a three-dimensional (3D) digital representation of the appearance of the virtual object to the virtual object so as to allow rendering the virtual object within a virtual environment. The three-dimensional representation may be the obtained digital representation of the real-world object or a three-dimensional representation derived therefrom. For example, some embodiments of the method disclosed herein may process the received digital representation to create the digital representation of the virtual object. Examples of this processing may include one or more of the following: a change in the spatial resolution, a scaling, a modification of one or more colors, a smoothing operation, and/or the like. The digital representation of the visual appearance of the virtual object may be in the form of a three-dimensional graphical representation.

In some embodiments, the process creates a data structure comprising a surface representation of the virtual object for drawing the virtual object. If movements of the virtual object are to be animated in the virtual environment, creating the 3D digital representation of the virtual object may further include creating a data structure representing a skeleton of bones for animating the virtual object. Creating may thus comprise creating the surface representation to have a shape and/or size/and/or color based on the detected shape and/or size and/or color of the toy construction model and creating the skeleton to have a shape and size based on the detected shape and/or size of the toy construction model. For example, creating the skeleton may comprise selecting one of a set of skeleton templates and a scaling the skeleton template based on the detected size and shape of the toy construction model; in some embodiments, a single template may suffice. For example the template skeleton may be defined such that the virtual object is animated so as to resemble a certain type of figure, such as a human-like figure having arms and legs and being animated to resemble a walking figure, or an animal having four legs, or a bird having wings and performing a flying movement, or a fish or snake-like figure being animated to perform a swimming or gliding movement. Selecting a skeleton template may be performed automatically, e.g. based on the detected shape of the toy construction model, and/or based on a user selection, e.g. a selection of the type of character to be created, such as a fish, a snake, a four-legged animal, etc.

In some embodiments, the process creates the 3D digital representation of the virtual object such that the virtual object—or only a part of the virtual object—appears to be constructed from toy construction elements. To this end, the process may create a virtual construction model created from virtual construction elements corresponding to the real-world toy construction elements of the toy construction system. In particular, in some embodiments, the process creates a data structure comprising information about a number of construction elements and their relative position and orientation relative to another and/or relative to a suitable coordinate system. The data structure may further comprise information, for each construction element of the virtual model, about the type of construction element, its color and/or further features, such as a weight, surface texture and/or the like. In some embodiments, the data structure representing a virtual construction element further comprises information about the type and positions of the coupling members of the construction element. Accordingly, the data structure of the virtual model may comprise connectivity information indicative of which virtual construction elements are interconnected with each other via which of their respective coupling members. An example of such a data structure is described in U.S. Pat. No. 7,439,972.

Alternatively or additionally, the process may create the three-dimensional representation with visible recurring features common to all or some toy construction elements of the system, such as coupling members. In one embodiment, the process detects positions of coupling members of the toy construction elements along the edges of the extracted two-dimensional view and adds graphical representations of corresponding coupling members at corresponding positions of the three-dimensional graphical representation, e.g. on corresponding positions on the circumferential surface of the three-dimensional graphical representation.

The 3D digital representation may be associated with a virtual object in a video game or other form of virtual environment. The various aspects described herein may be implemented with a variety of game systems, e.g. computer-generated virtual environments. Generally, a virtual object may represent a virtual character such as a human-like character, an animal-like character, a fantasy creature, etc. Alternatively, a virtual object may be an inanimate object, such as a building, a vehicle, a plant, a weapon, etc. In some embodiments, virtual objects whose counterparts in the real-world world are inanimate, e.g. a car, may be used as an animate virtual character in a virtual environment. Hence, in some embodiments the virtual object is a virtual character and, in some embodiments, the virtual object is an inanimate object.

A virtual character may exhibit behaviour by moving around within the virtual environment, by interacting with or generally engaging other virtual characters and/or with inanimate virtual objects present in the virtual environment and/or with the virtual environment itself and/or by otherwise evolving within the virtual environment, e.g. growing, aging, developing or loosing capabilities, attributes or the like. Generally, virtual objects have attributes, e.g. a capability, that influence the game play or other evolution of a virtual environment. For example, a car may have a certain maximum speed, or an object may have an attribute that determines whether or how a virtual character may interact with the virtual object, and/or the like.

To this end, the process comprises assigning virtual attributes, e.g. behavioural attributes such as capabilities, needs, preferences or other attributes of the virtual object, or other game-related attributes to a virtual object, e.g. based on detected visual characteristics of the real-world object, e.g. by using a mechanism as disclosed in international patent application PCT/EP2015/062381.

The attributes associated with the virtual object may include one or more global attributes indicative of a property of the virtual object as a whole. Examples of global attributes may include one or more of the following: attributes indicative of a capability or skill, attributes indicative of an energy level, attributes indicative of a global behaviour of the object, and/or the like.

Yet further examples of global attributes include an ability to move, e.g. an ability to fly or to move across a surface, a speed and/or mode of movement, etc. Other examples of attributes include local attributes that are associated with respective parts of the virtual object rather than with the virtual object as a whole. For example, local attributes may be indicative of a functional capability of a part of the object, e.g. an attribute indicative of a capability of a part of the virtual object to be moved relative to the remainder of the virtual object or relative to another part of the virtual object. Other examples of local attributes may be indicative of a capability of a part of the virtual object to discharge one or more virtual discharge elements, such as virtual projectiles, virtual light beams, virtual fluids and/or other virtual effects. Yet further examples of local attributes may include a capability of a part of the virtual object to interact with other virtual objects, e.g. to establish a connection, to exchange virtual elements, and/or the like. Generally, local attributes include functional/behavioural attributes that represent a function/behaviour different from static attributes like color, texture, etc that do not change.

The process may create a computer-generated virtual environment and simulate the evolution of the virtual environment over time, including the behaviour of one or more virtual characters and/or the attributes of one or more virtual objects within the virtual environment. For the purpose of the present description a computer-generated virtual environment may be persistent, i.e. it may continue to evolve and exist even when no user interacts with it, e.g. between user sessions. In alternative embodiments, the virtual environment may only evolve as long as a user interacts with it, e.g. only during an active user session. A virtual object may be at least partly user-controlled, i.e. the processor may control the behaviour of a virtual object at least partly based on received user inputs. A computer-generated virtual environment may be a single-user environment or a multi-user environment. In a multi-user environment more than one user may interact with the virtual environment concurrently, e.g. by controlling respective virtual characters or other virtual objects in the virtual environment. Computer-generated virtual environments and, in particular, persistent, multi-user environments are sometimes also referred to as virtual worlds. Computer-generated virtual environments are frequently used in game systems, where a user may control one or more virtual characters within the virtual environment. A virtual character controlled by the user is sometimes also referred to as "the player." It will be appreciated that the at least some embodiments of the aspects described herein may also be used in contexts other than game play. Examples of computer-generated virtual environments may include but are not limited to videogames, e.g. games of skill, adventure games, action games, realtime strategy games, role play games, simulation games, etc. or combinations thereof.

The part of the virtual object to which a local attribute is assigned may be identifiable as a part of the 3D digital representation of the visual appearance of the virtual object. For example, in embodiments where the 3D digital representation of the visual appearance of the virtual object comprises a plurality of geometry elements, e.g. a plurality of surface elements of a mesh representing a surface of the virtual object or a plurality of voxels of a volume representation of the virtual object, the selected part may comprise a selected subset of the geometry elements.

Selecting a part of the virtual object may be performed automatically, e.g. based on one or more detected features of the virtual object, or user-assisted, e.g. at least partly responsive to a user input.

In some embodiments, selecting a part of the virtual object comprises detecting, based on the 3D digital representation of the visual appearance of the virtual object, a predetermined feature of the virtual object, such as a geometric feature. The geometric feature may e.g. be a predetermined geometric shape, such as a circle, an ellipse, a polygon or the like. In some embodiments, the detection of a feature may comprise recognition of one or more object components. For example, in embodiments where the real-world object is a real-world toy construction model constructed from individual toy construction elements, the detected feature may be one or more recognised toy construction elements that are part of the real-world toy construction model.

In some embodiments, the user may indicate a portion of the virtual object and the process may then detect a predetermined feature within the user-selected portion. The process may then select a part of the virtual object based on the detected feature. For example, the process may select the detected feature as the selected part or the process may select a part of the virtual object in a proximity of the detected feature as the selected part. Generally, a user may indicate a portion of the virtual object in a number of ways. For example, a user may indicate, e.g. using a pointing device or another pointing mechanism, a contour of a region within a representation of the virtual model on a display. Alternatively, the user may point to a location on the surface of the virtual surface, and the process may determine a part of the virtual object as a part having one or more properties in common with the user-selected location, e.g. the same color, texture, etc. Alternatively or additionally, the process may use one or more object segmentation techniques to segment the virtual model into a number of segments. The process may then allow the user to select one or more of the segments.

In some embodiments, the process may detect multiple candidate features. The process may then indicate the detected candidate features and allow a user to select one or more of the detected candidate features. The process may then determine the selected part based on the user-selected candidate feature.

The assigned attribute may be selected automatically, manually by a user or semi-automatic, e.g. in a user-assisted manner.

The selection of the attribute may at least in part be based on one or more characteristics of the part of the virtual object to which the attribute is assigned and/or on one or more characteristics of another part of the virtual object. For example the type of attribute or one or more characteristics of the attribute may be selected based on a characteristics of the part of the virtual object and/or of another part of the virtual object. The characteristics of the part of the virtual object or of another part of the virtual object may include a color, a size, a shape or another detectable characteristics. Characteristics of the attribute may include a strength, a level, or another property of the attribute.

Accordingly, in some embodiments, assigning one or more attributes to the selected part of the virtual object comprises:
    detecting one or more properties of the selected part and/or of one or more other parts of the virtual object, different from the selected part; and
    selecting the one or more attributes based on the detected one or more properties.

Each of the detected one or more properties may be a visual property of the toy construction model that can be attained by sight, e.g. a property that can be derived from a color and/or a shape and/or a size of the toy construction model.

For example, when a selected part has been assigned a capability of discharging a discharge element, the process may select a discharge element to be discharged from the selected part based on a property of another part of the virtual object, e.g. based on a color of a portion of the virtual object in a proximity of the selected part. For example, a red color may result in the discharge element being fire while a blue color may result in the discharge element being water. In other embodiments, one or more other attributes may be selected based on a property of the selected part and/or based on a property of another part of the virtual object. Examples of other attributes may include a degree of a function, e.g. an amount of discharge elements to be discharge, a discharge speed, a repetition rate, and/or the like.

In some embodiments, the assigned attribute has an associated attribute direction and the method further comprises:
    determining a direction associated with the selected part of the virtual object; and
    assigning the determined direction as an attribute direction to the assigned attribute.

For example, the attribute may be a movement and the attribute direction may be a direction of the movement. Alternatively, the attribute may be a rotation of a part of the virtual object and the attribute direction may be a direction of the axis of rotation. Yet alternatively, the attribute may be a discharge capability of discharging one or more discharge elements from a part of the virtual object, and the attribute direction may be a direction along which the discharge element is discharged.

The direction associated with the selected part may e.g. be determined as a surface normal of a surface location of the predetermined part, e.g. a surface normal at a centre, e.g. a geometric center, of the surface of the selected part. Alternatively, the direction of the part may be determined using another mechanism, e.g. by detecting one or more edges of the selected part and detecting a direction of the one or more edges. In yet another alternative embodiment, the direction may be detected from one or more detected features. For example, the process may detect an ellipse in a view of the virtual object and detect the direction from the major and minor axes of the ellipse, e.g. such that the direction is a normal direction from a center of a circular disc that results in an ellipse when viewed from said viewpoint.

In some embodiments, the virtual object is a vehicle operable by a virtual character or a creature on which a virtual character can ride; the assigned attribute is a riding position of the virtual character relative to the virtual object; and the method comprises:
  determining a surface normal of a surface of the virtual object at a selected riding position; and
  determining a riding posture of the virtual character based on the determined surface normal.

In some embodiments, the process allows a user to indicate the riding position. During the selection process the process may animate a virtual character to climb on top of the virtual object towards the indicated riding position. To this end, the process may use the surface normal of the digital representation of the virtual object to determine the orientation of the virtual character while climbing towards the riding position.

In some embodiments, selecting a part of the virtual object comprises:
  recognising a part of the virtual object as a representation of a recognised one of a plurality of predetermined parts, the recognised part corresponding to a subset of said plurality of geometric elements; wherein digital representations of the plurality of predetermined parts are stored in a library of predetermined parts; wherein one or more of the digital representations of the predetermined parts have associated with them one or more predetermined attributes; and
  replacing the subset of geometric elements with the stored digital representation of the recognised predetermined part.

For example, the real-world object may be a toy construction model constructed from a plurality of construction elements and the process may have access to a library of virtual construction elements corresponding to the respective real-world construction elements. The toy construction elements may comprise coupling members for detachably interconnecting the toy construction elements with each other. The process may recognise one or more construction elements as being part of the real-world object. The process may then replace the corresponding part or parts of the virtual object that correspond to the recognised toy construction elements by the digital representation obtained from the repository. Accordingly, the virtual object may be represented based on a more accurate digital representation of the individual construction elements than may be achievable from a conventional 3D reconstruction pipeline. Moreover, some of the virtual construction elements may have predetermined functionalities associated with them. For example, a wheel may be animated to rotate, a door may be animated to be opened, a fire hose may be animated to eject water, a canon may be animated to discharge projectiles, etc.

A user may thus create a real-world toy construction model resembling an object to be used as a virtual object in a computer-generated virtual environment. As the user may construct these objects from toy construction elements, the user has a large degree of freedom as to how the object is constructed. Moreover, the system provides the user with a flexible, yet easy-to understand and easy-to use mechanism for influencing the desired behaviour or other attributes of the virtual object in the virtual environment, e.g. behavioural attributes such as capabilities, needs, preferences or other attributes of the virtual object, or other game-related attributes of a virtual object.

The coupling members may utilise any suitable mechanism for releasably connecting construction elements with other construction elements. In some embodiments, the coupling members comprise one or more protrusions and one or more cavities, each cavity being adapted to receive at least one of the protrusions in a frictional engagement.

In some embodiments, the toy construction elements may adhere to a set of constraints, e.g. as regards to their shapes and size and/or as regards the positions and orientations of the coupling members and to the coupling mechanism employed by the coupling members. In some embodiments, at least some of the coupling members are adapted to define a direction of connection and to allow interconnection of each construction element with another construction element in a discrete number of predetermined relative orientations relative to the construction element. Consequently, a large variety of possible building options are available while ensuring interconnectivity of the building elements. The coupling members may be positioned on grid points of a regular grid, and the dimensions of the toy construction elements may be defined as integer multiples of a unit length defined by the regular grid. It will be understood that a three-dimensional grid may be defined by a single unit length, by two unit lengths, e.g. one unit length applicable in two spatial dimensions while the other unit length is applicable in the third spatial dimension. Yet alternatively, the three-dimensional grid may define three unit lengths, one for each spatial dimension. Coupling members consistent with the toy construction system thus adhere to the connectivity rules imposed by the toy construction system, e.g. including the type, position and/or orientation of the coupling members, and they are configured to engage mating coupling elements of one or more of the toy construction elements of the toy construction system.

The present disclosure relates to different aspects including the method described above and in the following, corresponding apparatus, systems, methods, and/or products, each yielding one or more of the benefits and advantages described in connection with the first mentioned aspect, and each having one or more embodiments corresponding to the embodiments described in connection with the first mentioned aspect and/or disclosed in the appended claims.

In particular, the present disclosure further relates to a computer-implemented method for creating a virtual object; the method comprising:
  receiving a digital representation of a real-world object, the digital representation representing a visual appearance of a shape of the real-world object;
  detecting, from the received digital representation, one or more geometric features of the real-world object;
  creating a virtual object representing the real-world object; and
  assigning, based on the detected one or more geometric features, a direction of travel to the created virtual object.

The present disclosure further relates to a data processing system configured to perform the steps of an embodiment of one or more of the methods disclosed herein. To this end, the data processing system may comprise or be connectable to a computer-readable medium from which a computer program can be loaded into a processor, such as a CPU, for execution. The computer-readable medium may thus have stored thereon program code means adapted to cause, when executed on the data processing system, the data processing system to perform the steps of the method described herein. The data processing system may comprise a suitably programmed computer such as a portable computer, a tablet computer, a smartphone, a PDA or another programmable computing device having a graphical user-interface. In some embodiments, the data processing system may include a client system, e.g. including a camera and a user interface, and a host system which may create and control a virtual environment. The client and the host system may be connected via a suitable communications network such as the internet.

Generally, here and in the following the term processor is intended to comprise any circuit and/or device and/or system suitably adapted to perform the functions described herein. In particular, the above term comprises general- or special-purpose programmable microprocessors, such as a central processing unit (CPU) of a computer or other data processing system, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. The processor may be implemented as a plurality of processing units.

Some embodiments of the data processing system include a sensor device such as an image capturing device, e.g. a camera, e.g. a video camera, or any other suitable device for obtaining one or more images of a toy construction model or other real-world object. Other embodiments may be configured to generate a digital representation of the real-world object and/or retrieve a previously generated digital representation.

The sensor may comprise a radiation source operable to direct radiation towards the toy construction model. For example, an image-capturing device may comprise a flashlight, one or more LEDs, a laser, and/or the like. Alternatively, the image sensor device may be operable to detect ambient radiation reflected by the object. Here, the term reflection is intended to refer to any type of passive emission responsive to received radiation or waves, including diffuse reflection, refraction, etc. Embodiments of the data processing system may include a display or other output device for presenting the virtual environment to a user. Embodiments of the data processing system may also comprise a scanning station, e.g. including an object support such as a turntable.

The present disclosure further relates to a computer program product comprising program code means adapted to cause, when executed on a data processing system, said data processing system to perform the steps of one or more of the methods described herein.

The computer program product may be provided as a computer-readable medium, such as a CD-ROM, DVD, optical disc, memory card, flash memory, magnetic storage device, floppy disk, hard disk, etc. In other embodiments, a computer program product may be provided as a downloadable software package, e.g. on a web server for download over the internet or other computer or communication network, or an application for download to a mobile device from an App store.

The present disclosure further relates to a toy construction system that comprises a data processing system as described above and a plurality of toy construction elements as described herein. The data processing system may include the processor; the data processing system may further comprise an image capturing device and a display or other output device.

The present disclosure further relates to a toy construction set comprising a plurality of toy construction elements, and instructions to obtain a computer program computer program code that causes a data processing system to carry out the steps of an embodiment of one or more of the methods described herein, when the computer program code is executed by the data processing system. For example, the instructions may be provide in the form of an internet address, a reference to an App store, or the like. The toy construction set may even comprise a computer-readable medium having stored thereon such as computer program code. Such a toy construction set may even comprise a camera or other image capturing device connectable to a data processing system. Optionally, the toy construction set may further include a scanning station, a sensor device or both.

Embodiments of the toy construction system allow a user to construct a large variety of toy construction models in a uniform and well-structured manner and with a limited set of different toy construction elements. For example, a toy construction system may be provided as a toy construction set comprising a number of toy construction elements. The user may also create a large variety of virtual objects which exhibit a large variety of behavioural attributes in a virtual environment.

DETAILED DESCRIPTION

Various aspects and embodiments of methods, apparatus and toy construction systems disclosed herein will now be described with reference to toy construction elements in the form of bricks, e.g. in the form of toy construction elements available under the name of LEGO. However, the invention may be applied to other forms of toy construction elements for use in toy construction sets.

Figure 1:
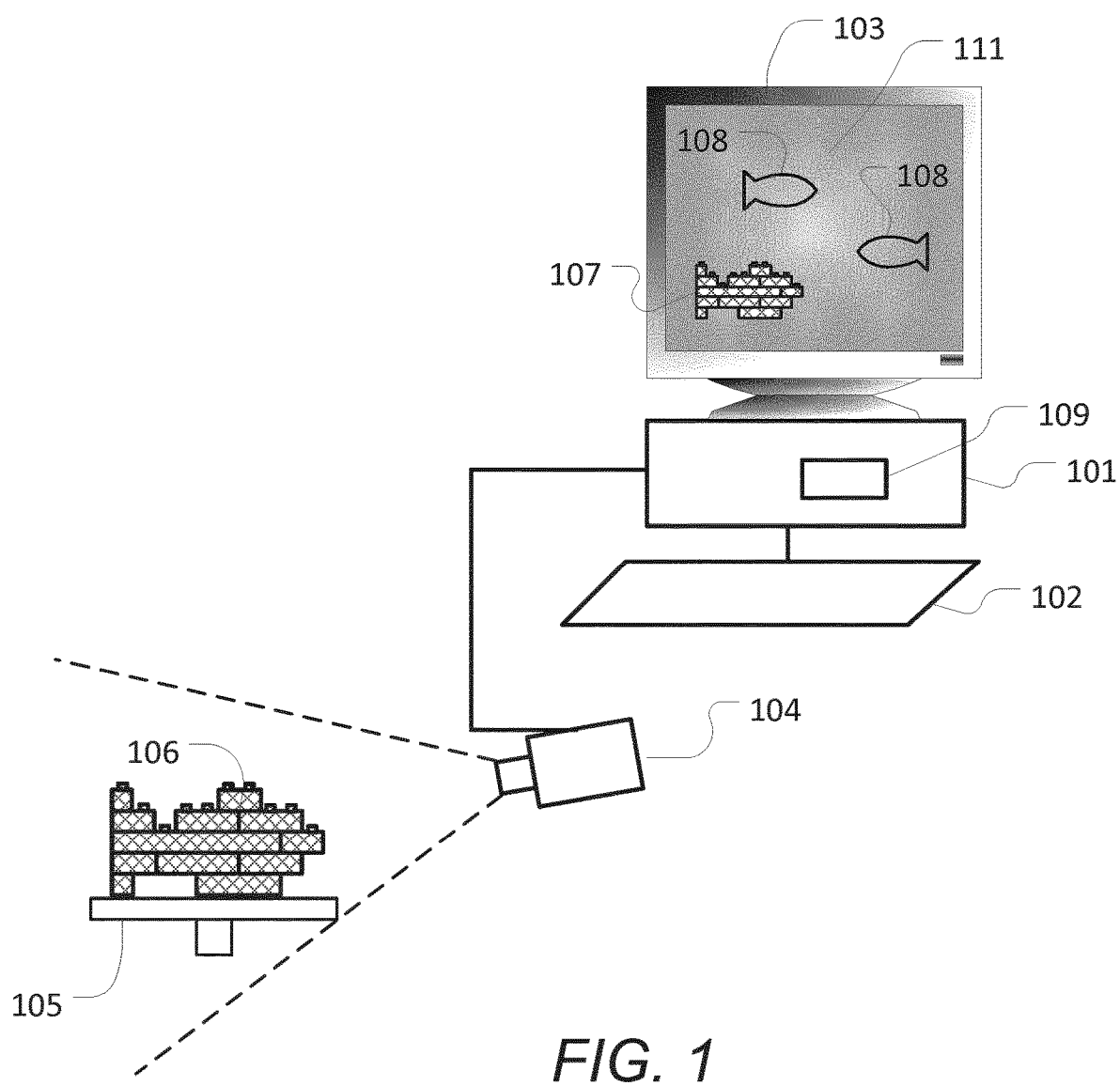
FIG. 1 schematically illustrates an embodiment of a system disclosed herein.

FIG. 1 shows an embodiment of a toy construction system. The system comprises a computer 101, an input device 102, a display 103, a sensor device comprising a camera 104, an object support comprising a turntable 105, and a toy construction model 106 constructed from one or more toy construction elements.

The computer 101 may be a personal computer, a desktop computer, a laptop computer, a handheld computer such as a tablet computer, a smartphone or the like, a game console, a handheld entertainment device, or any other suitably programmable computer. The computer 101 comprises a processor 109 such as a Central Processing Unit (CPU) and one or more storage devices such as a memory, a hard disk, and/or the like.

The display 103 is operatively coupled to the computer 101 and the computer 101 is configured to present a graphical representation of a virtual environment 111 on the display 103. Though illustrated as separate functional blocks in FIG. 1, it will be appreciated that the display may be integrated in the housing of the computer.

The input device 102 is operatively coupled to the computer 101 and is configured to receive user inputs. For example, the input device may comprise a keyboard, a game controller, a mouse or other pointing device, and/or the like. In some embodiments, the system comprises more than one input device. In some embodiments an input device may be integrated in the computer and/or the display, e.g. in the form of a touch screen. It will be appreciated that the system may comprise further peripheral devices operatively coupled to, such as integrated into, the computer.

The camera 104 is operable to capture images of the toy construction model 106 and to forward the captured images to the computer 101. To this end, a user may position the toy construction model 106 on the turntable 105. In some embodiments, the user may construct the toy construction model on top of a base plate. The camera may be a digital camera operable to take digital pictures, e.g. in the form of a two-dimensional array of pixels. In particular, the camera may be configured to capture light intensities for each pixel and additional information such as polarisation information and/or a direction of a surface normal for each pixel or for groups of pixels. Alternatively other types of sensor devices, e.g. other types of image capturing devices may be used. Also, in alternative embodiments, the system does not use a turntable.

The display 103, the camera 104 and the input device 102 may be operationally coupled to the computer in a variety of ways. For example one or more of the above devices may be coupled to the computer via a suitable wired or wireless input interface of the computer 101, e.g. via a serial or parallel port of the computer such as a USB port, via Bluetooth, Wifi or another suitable wireless communications interface. Alternative, one or all of the devices may be integrated into the computer. For example, the computer may comprise an integrated display and/or input device and/or an integrated camera. In particular, many tablet computers and smartphones comprise an integrated camera, an integrated touch screen operable as a display and input device.

The computer 101 has stored thereon a program, e.g. an App or other software application, adapted to simulate a virtual environment, to process captured images and to create virtual objects as described herein. For example the virtual environment may be a part of a computer game.

It will be appreciated that, in some embodiments, the computer 101 may be communicatively connected to a host system, e.g. via the Internet or another suitable computer network. At least a part of the processing described herein may then be performed by the host system. For example, in some embodiments, a host system may generate and simulate a virtual environment, such as a virtual world which may be accessible by multiple users from respective client computers. A user may use a client computer executing a suitable program to capture an image. The captured images may be processed by the client computer or uploaded to the host system for processing and creation of a corresponding virtual object. The host system may then add the virtual object to the virtual world and control the virtual object within the virtual world as described herein.

In the example of FIG. 1, the virtual environment 111 is an underwater environment such as a virtual aquarium or other underwater environment.

The virtual objects 107, 108 resemble fish or other underwater animals or creatures. However, it will be appreciated that other types of virtual environments may be implemented where the virtual objects represent other types of virtual objects, such as other types of virtual characters, animals, creatures, vehicles, accessories, tools, etc.

In the example of FIG. 1, the computer has created one virtual object 107 based on the captured images of the toy construction model 106. The computer has created the virtual object 107 so as to resemble the toy construction model, e.g. by creating a 3D mesh or another suitable form of representation. In the example of FIG. 1, the virtual object 107 resembles the shape and color of the toy construction model 106. In the present example, the virtual object even resembles the individual toy construction elements from which the toy construction model 106 has been constructed. It will be appreciated, however, that different levels of resemblance may be implemented. For example, in some embodiments, the virtual object may be created so as to resemble only the overall shape of the construction model without simulating its internal structure of individual toy construction elements. The virtual object may also be created to have a size corresponding to the size of the virtual construction element, e.g. by providing a reference length scale on the turntable 105 so as to allow the computer to determine the actual size of the toy construction model. Alternatively, the computer may use the size of the toy construction elements as a reference length scale. In yet alternative embodiments, the user may manually scale the size of the virtual object.

The system illustrated in FIG. 1 may be configured to create a 3D representation of a real-world object which may then be used to create a virtual object or character, e.g. as described in more detail below.

Figure 2:
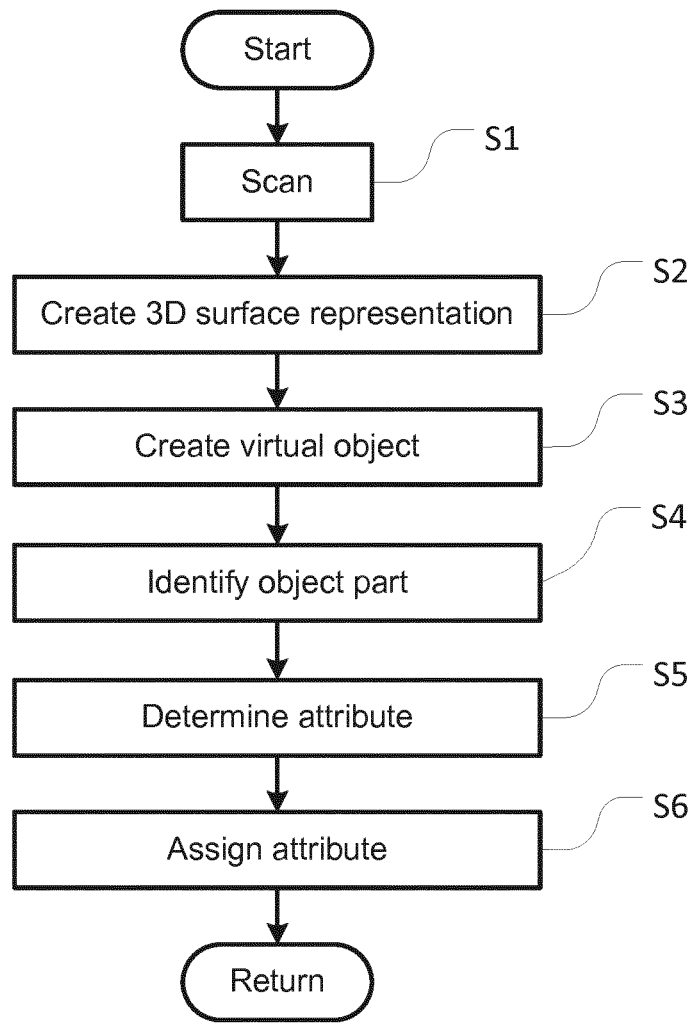
FIG. 2 shows a flowchart of an embodiment of a process described herein.

FIG. 2 shows a flowchart of an embodiment of a process described herein. For example, the process may be performed by the system described in FIG. 1 or by another suitable programmed data processing system.

In an initial step S1, the process obtains data indicative of the visual appearance of a toy construction model or of another real-world object. For example, the process may capture a plurality of digital images of a toy construction model at respective angular positions of a turntable on which the toy construction model is positioned, or otherwise from respective viewpoints. The data may include digital images and/or a depth map and/or another form of data representing the visual appearance of the object, e.g. the surface texture, color, shape, etc.

In subsequent step S2, the process constructs a 3D digital representation of the toy construction model from the obtained data, e.g. from the digital images. To this end, the process may perform one or more image processing steps known per se in the art of digital image processing. For example the processing may comprise one or more of the following steps: background detection, edge detection, color calibration, color detection.

A process for generating a 3D digital representation of a real-world object from a plurality of captured images may employ any suitable technique known as such in the art of object reconstruction. For example, in one embodiment, the captured images are processed in order to extract:

information about the real-world scene as seen through the camera,
a turntable position or camera viewpoint relative to the object, and
an object silhouette.

In a subsequent step, the obtained silhouettes may be projected onto a voxelized volume that is carved accordingly. Subsequently, a marching cube algorithm is applied to the 3D object obtained from carving. The final mesh is then obtained and the textures cut out from the camera frames are applied on top of that. The process may result in a mesh representation of the surface of the object, e.g. using triangles of other polygons. Alternatively, the process may result in a voxel representation of the object.

In subsequent step S3, the process creates a virtual object. The virtual object has a visual appearance defined by the 3D representation created in the previous step or by a 3D representation derived therefrom. In addition, the virtual object may comprise additional global attributes such as attributes defining behavioural characteristics of the virtual object. These characteristics may define how the object moves, its capabilities and functions, etc.

In subsequent step S4, the process selects a part of the 3D representation of the virtual object, e.g. a part of the 3D shape of the object. This step may be performed fully automatic or it may be user assisted. For example, a user may manipulate a representation of the virtual object so as to identify the part to be selected. Alternatively, the process may use an object segmentation technique and/or a feature detection technique and/or another suitable mechanism to identify a part of the virtual object. Examples of methods for selecting a part of a virtual object will be described in greater detail below. In some embodiments, the process may identify a number of candidate parts from which the user may select one or more parts. The selected part may be identified as such in a suitable data structure representing the virtual object, e.g. by identifying a plurality of mesh elements or voxels representing the selected part of the object.

In subsequent step S5, the process determines a local attribute to be assigned to the selected part of the virtual object. To this end, the user may select an attribute, e.g. from a list of available attributes. Alternatively or additionally, the process may automatically determine an attribute to be assigned to the selected part—or at least one or more characteristics of the attribute. For example, the process may select an attribute based on a property of the selected part and/or based on a property of other parts of the virtual object. Yet alternatively, the process may determine a plurality of candidate attributes from which the user may select an attribute.

In subsequent step S6, the process assigns the determined attribute to the selected part of the virtual object. To this end, the process may set a corresponding attribute value associated with the selected part of the object in the data structure representing the virtual object. It will be appreciated that some types of attributes may be represented by a single value while other types of attributes may have a more complex representation.

It will be appreciated that more than one attribute may be assigned to a selected part of the object and that more than one part of the object may be selected and assigned a virtual attribute. To this end, steps S4-S6 may be repeated a suitable number of times.

FIGS. 3-5 and 7-8 illustrate examples of a user-assisted selection of a part of a virtual object.

Figure 3:
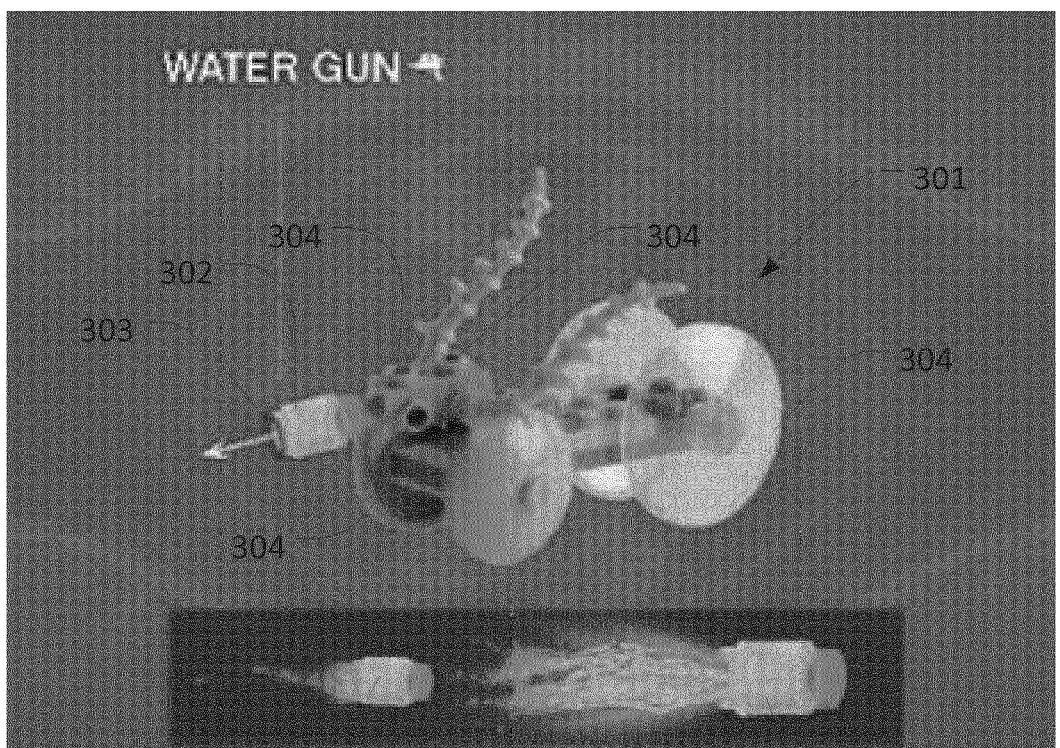
FIGS. 3-5 illustrate examples of a user-assisted selection of a part of a virtual object.

In particular, FIG. 3 illustrates a selection of a part of the object based on the detection of a predetermined feature. More specifically, in the present example, the process detects ellipses in a representation of the virtual object, e.g. in a 2D view of the virtual object. FIG. 3 shows a representation of a created virtual object 301 within a display area of a computer display, e.g. of the system of FIG. 1 or another suitably programmed processing device or system. In this example, the virtual object represents a vehicle that may be used by a virtual character in a computer game. The virtual object has been created based on a plurality of images taken from different viewpoints of a real-world vehicle constructed from toy construction elements, e.g. as described above.

The data processing system may provide functionality that allows the user to manipulate the view of the created virtual object 301, e.g. by rotating the object, by zooming, etc. The process may be configured to detect predetermined shapes, e.g. ellipses, polygons, etc. in the current view and highlight the detected shapes. To this end, the process may use any suitable method for the detection of predetermined features in images or 3D representations that are known as such in the art. In the example of FIG. 3, the process has detected an ellipse at the end of a tubular construction element 302. The process has highlighted the detected ellipse by drawing an emphasized ellipse 303 in a predetermined color, e.g. in red. It will be appreciated that the process may initially identify multiple features, e.g. additional ellipses 304. The process may then select one of the detected features, e.g. based on additional criteria, such as color, size, orientation, user input, etc.

The process may then assign an attribute to the selected feature 303 of the virtual object, e.g. automatically or by allowing the user to select a feature. In the example of FIG. 3, the process has selected a water gun functionality as an attribute to be assigned to the selected feature 302. The water gun functionality simulates the discharge of water from the detected ellipse. The process may allow the user to select one or more additional characteristics, e.g. the amount of water to be discharged, the speed or range of the discharged water, the direction of discharge, etc. In FIG. 3, this is illustrated by symbols 305 and 306 illustrating two available choices of water guns and allowing the user to select one type of water gun. Alternatively or additionally, the process may automatically determine one or more attribute characteristics of the assigned attribute. In particular, the process may determine such attribute characteristics based on a detected property of the selected part and/or based on a property of other parts, e.g. neighbouring parts, of the virtual object.

For example, in the present example of a water gun, the color of the selected part may determine the color of the water of a water cannon attribute or another attribute of the discharged water, e.g. the virtual temperature of the discharged water which in turn may influence the effect the discharged water has on aspects of the game play. The size or shape of a selected part may determine the way a discharge element is discharged when a discharge attribute is assigned, e.g. the way the water sprays if a water cannon attribute is applied. As yet another example, a graphic marker of the real-world object and detected as part of the obtained digital representation may determine that the water is hot if a water cannon attribute is applied.

The water gun functionality is an example of an attribute that has a direction associated with it, namely in this case the direction along which the water is discharged. In FIG. 3, this direction is indicated by an arrow 307. The direction may be user-selectable or it may be determined automatically by the process, e.g. based on the orientation of the ellipse and based on the direction and size of the major and minor axes of the ellipse.

Generally, FIG. 3 illustrates an example of a user-assisted selection of a model feature where the process automatically detects one or more model features, and where the user manually selects one or more specific features to which a digital attribute is to be assigned. Methods for implementing a user selection will be described in greater detail below. Examples of detectable features include a color, a shape (e.g. circle, polygon, ellipse, etc.), a 3D geometric feature (e.g. a toy construction element), an edge, a face, a polygon, a material (e.g. rubber), a graphic asset/marker and/or the like.

Figure 4:
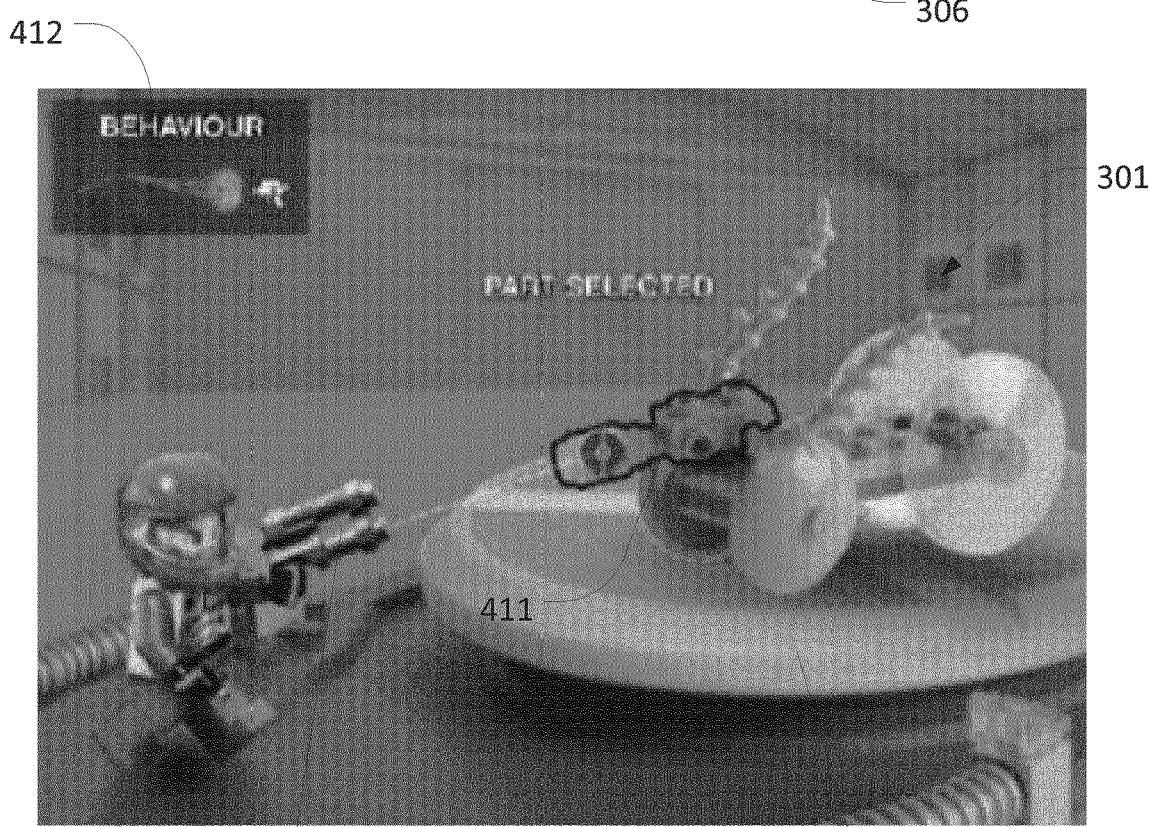

FIG. 4 illustrates another example of a user-assisted selection process for selecting a part of the object based on the detection of a predetermined feature. In the example of FIG. 4, the process initially performs an object segmentation process, e.g. using a mesh segmentation algorithm or by detecting toy construction elements or other predetermined components of an object. The user may then identify one or more of the segments, e.g. by pointing at a segment or by selecting a color or other feature of a segment to be selected or the like. Examples of selectable features include a color, a shape (e.g. circle, polygon, ellipse, etc.), a 3D geometric feature (e.g. a toy construction element), an edge, a face, a polygon, a material (e.g. rubber), a graphic asset/marker and/or the like. The process then assigns an attribute to the selected segment of the virtual object, e.g. automatically or by allowing the user to select a feature, e.g. as described above.

More specifically, FIG. 4 shows a representation of a created virtual object 301 within a display area of a computer display, e.g. of the system of FIG. 1 or another suitably programmed processing device or system. In this example, the virtual object is represented as being positioned on a turntable 408 of a scanning station. The process shows a virtual character 409 that can be controlled by the user to walk around the virtual object 301 and to target respective parts of the virtual object with a targeting reticule 410, e.g. a pointer, cross hair or other aiming device. In the example of FIG. 4, the process has highlighted a segmented part 411 of the virtual object that is currently targeted by the virtual character 409. The user may now assign a user-selected or an automatically selected attribute, e.g. as illustrated by the functional feature 412 that may be assigned to the segment 411.

As mentioned above, the automatic segmentation may be based on a detection of individual toy construction elements or other components in the representation of the real-world object. To this end, the process may have access to a library of representations of a plurality of known toy construction elements or other known components. The known components may be stored as CAD files or as representations, e.g. as described in WO 2004/034333 or in another suitable form. Corresponding components of the virtual object may then be detected and recognised by a suitable object recognition process known as such in the art. The recognised components may then be user selectable such that attributes may be assigned to individual components or groups of components, e.g. to a subassembly of two or more toy construction elements, e.g. including animals, known figures, characters etc. or parts thereof, e.g. a torso part, a leg part, an engine part, a wheel, etc. In yet other embodiments, one or more parts of the virtual object may be detected and recognised based on known graphic assets/markers or the like.

Figure 5:
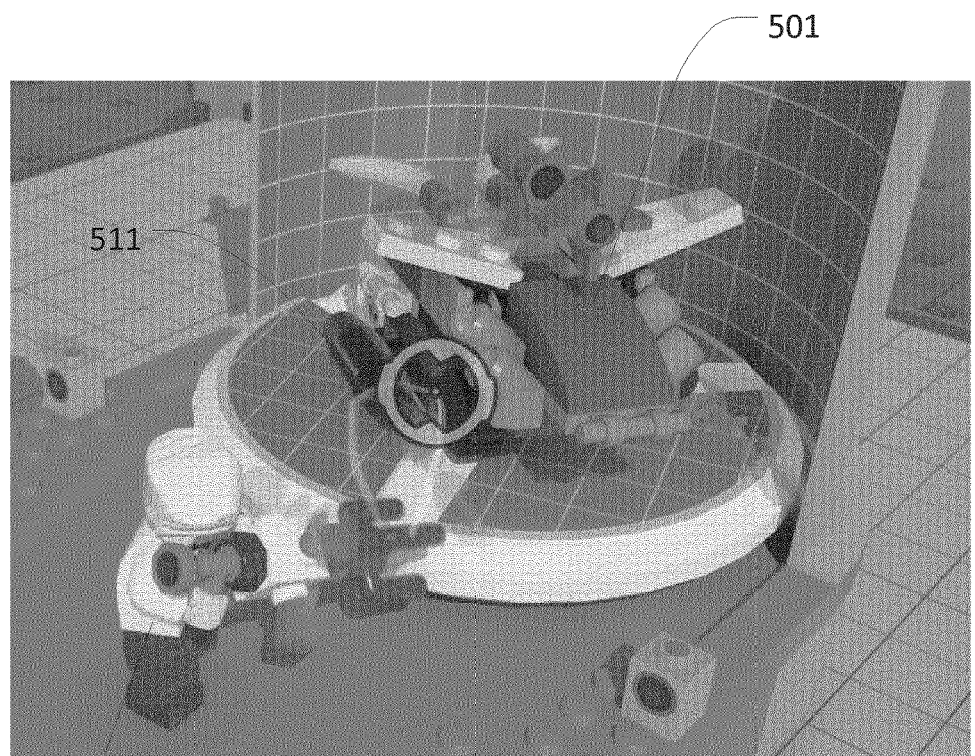

FIG. 5 shows another example of a user-assisted selection process for selecting a part of the object based on the detection of a predetermined feature. The example of FIG. 4 is similar to the example of FIG. 4 in that a representation of a virtual object 501, which has been obtained based on images captured of a real-world object positioned on a turntable of a scanning station, is shown within the display area of a display of a computer, e.g. of the system of FIG. 1. In the present example, the real-world object is a toy construction model constructed from toy construction elements and the process has identified individual toy construction elements as part of the virtual object as described above. The process provides functionality that allows the user to control a virtual character 409 to target respective parts of the virtual object. When the targeted parts correspond to recognised toy construction elements, the process may automatically assign a predetermined attribute to the selected part, e.g. a predetermined attribute that is associated with the stored known toy construction element in a library of known toy construction elements. Alternatively, the recognised object may have multiple available attributes associated with it from which the user may select one or more attributes to be assigned to the selected part. In the example of FIG. 5, the virtual character 409 has targeted a part 511 that has been recognised as a toy construction element which has a plurality of available attributes associated with it. Accordingly, in response to the selection of the part 511 by the user, the process may display a selection menu allowing the user to select one of the available attributes.

Figure 6:
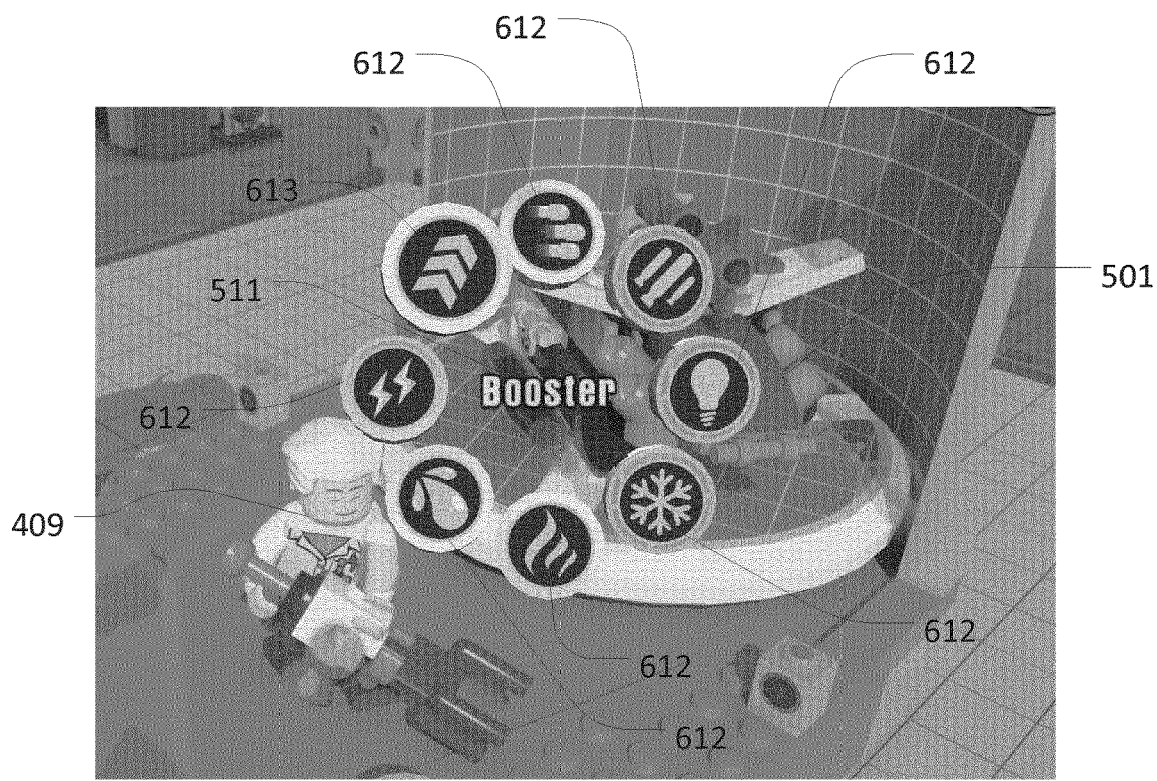
FIG. 6 illustrates an example of a user-assisted identification of an attribute to be assigned to a selected part of a virtual object.

An example of the selection process is illustrated in FIG. 6 which shows the displayed scene after the user has selected part 511 and after the user has selected a booster functionality by clicking on one icon 613 of a plurality of selectable icons 612, each icon representing one of the available attributes for the selected part 510. The selected icon 613 is highlighted accordingly.

Figure 7:
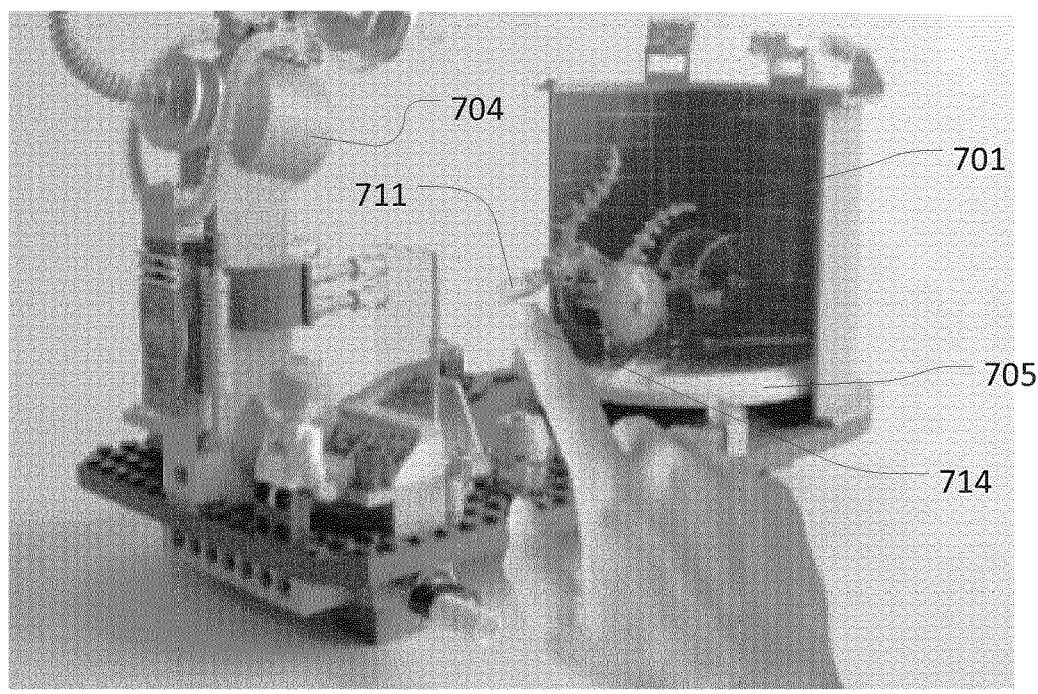
FIGS. 7-8 illustrate further examples of a user-assisted selection of a part of a virtual object.

FIG. 7 illustrates another mechanism for selecting a part of a virtual object. In the example of FIG. 7, the process receives captured data indicative of a user pointing at a part of the corresponding real-world object 701 based on which the virtual object has been created, e.g. by the process described above.

In particular, FIG. 7 illustrates a scanning station comprising a turntable 705 and an image capture device 704 for capturing images of the real-world object 701 positioned on the turntable. The image capture device captures one or more images while the user points at a part 711 of the real-world object. The process then detects which part the user has pointed at, and identifies the corresponding part of the virtual object, e.g. based on a pre-segmentation of the virtual object as described above. The user may e.g. point at the selected part with a finger 714, as illustrated in FIG. 7 or with a specific pointing device, e.g. a stick which may have a tip that is easily detectable by the system. For example, a tip of the pointing device may comprise a marker feature. The detection of the selected part of the object may thus be performed by a suitable image processing technique known as such in the art and based on one or more images of the user pointing at a part of the real-world object.

Figure 8:
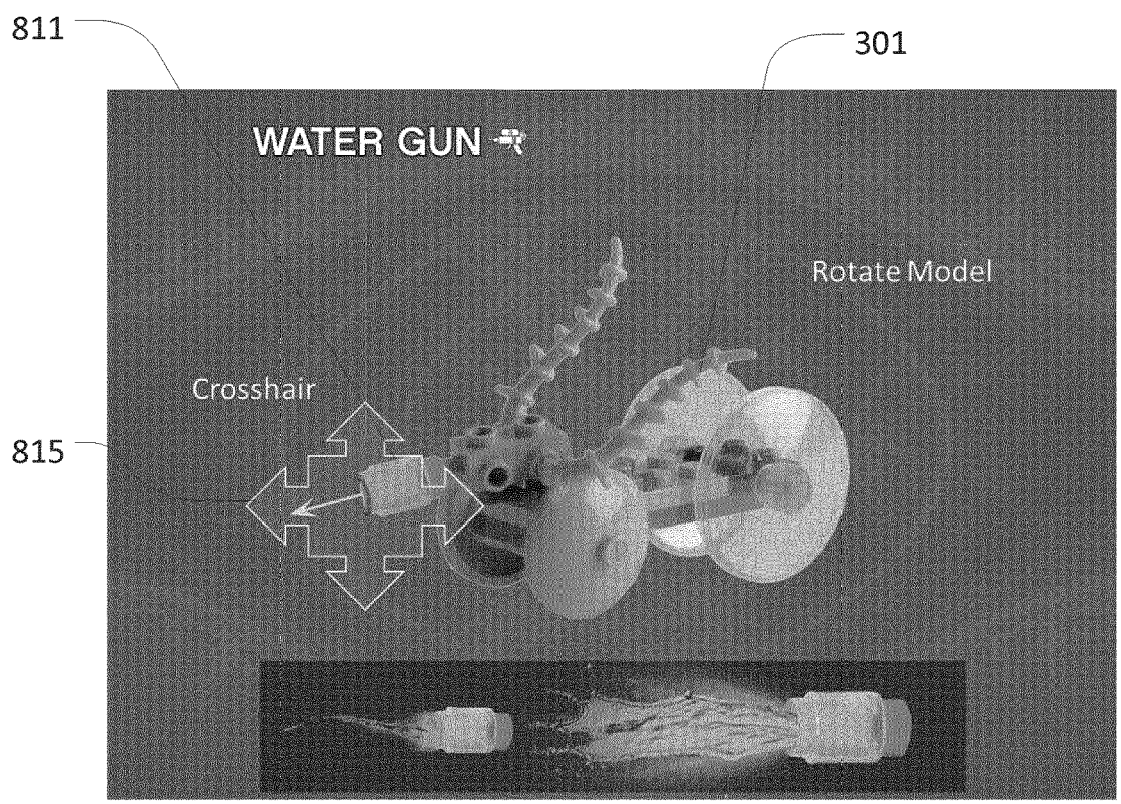

FIG. 8 shows another mechanism that allows a user to select a part of a virtual object. In particular, FIG. 8 shows a representation of a created virtual object 301 within a display area of a computer display, e.g. as described in connection with FIG. 3. However, in the example of FIG. 8, the user may use a cross-hair 815 or other pointing mechanism to point at a target part 811 of a displayed representation of the virtual object. The user may also rotate and/or resize the displayed representation to further facilitate the identification of the user selected part. The user may then select an attribute to be assigned to the selected part or the attribute may be automatically selected as described above.

In general, the process may provide one or more mechanisms for a user-controlled targeting/selection of individual parts of a virtual object, e.g. including:

- A finger of the user and/or a pointing device, such as a "magic wand" is tracked by a camera that captures images of the corresponding real-world object as the user points at a part of the real-world object.
- The user uses a rolling cursor to select features/parts.
- A user controlled virtual character moves around a 3D representation of the virtual object and targets a part of the virtual object with a target reticule.
- A virtual-reality interface is used that allows a user to rotate and interact with a 3D representation of the virtual object.

Figure 9:
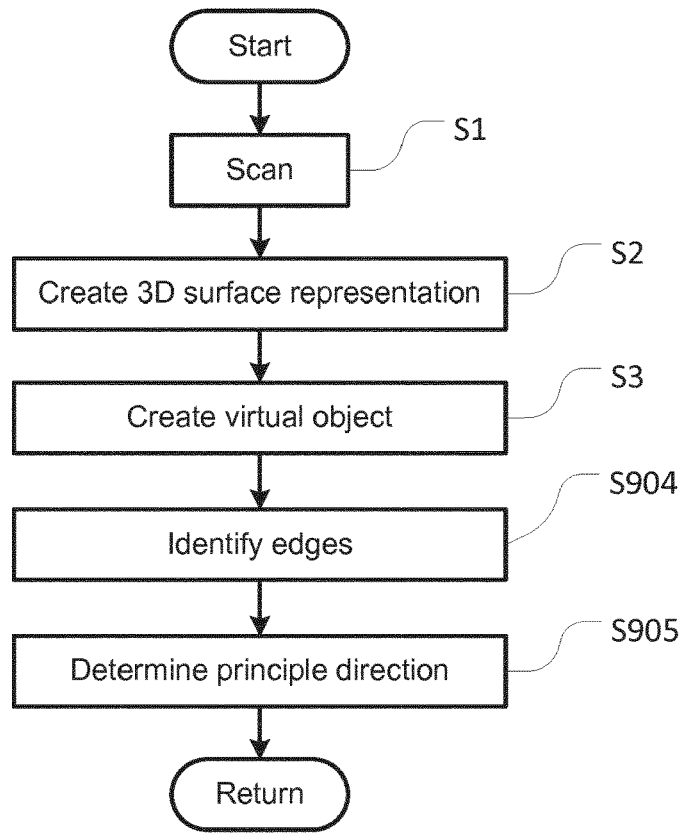
FIG. 9 shows a flow diagram of a process for determining a principle direction, e.g. a direction of movement, of a virtual object that was created based on images or other form of a scan of a real-world object.

FIG. 9 shows a flow diagram of a process for determining a principle direction, e.g. a direction of movement, of a virtual object that was created based on images or based on another form of a scan of a real-world object. For example, the process may be performed by the system described in FIG. 1 or by another suitable programmed data processing system.

In initial steps S1-S3, the process obtains data indicative of the visual appearance of a toy construction model or of another real-world object (step S1), constructs a 3D digital representation of the toy construction model from the obtained data (step S2) and creates a virtual object (step S3), all as described in connection with the process of FIG. 2.

Figure 10:
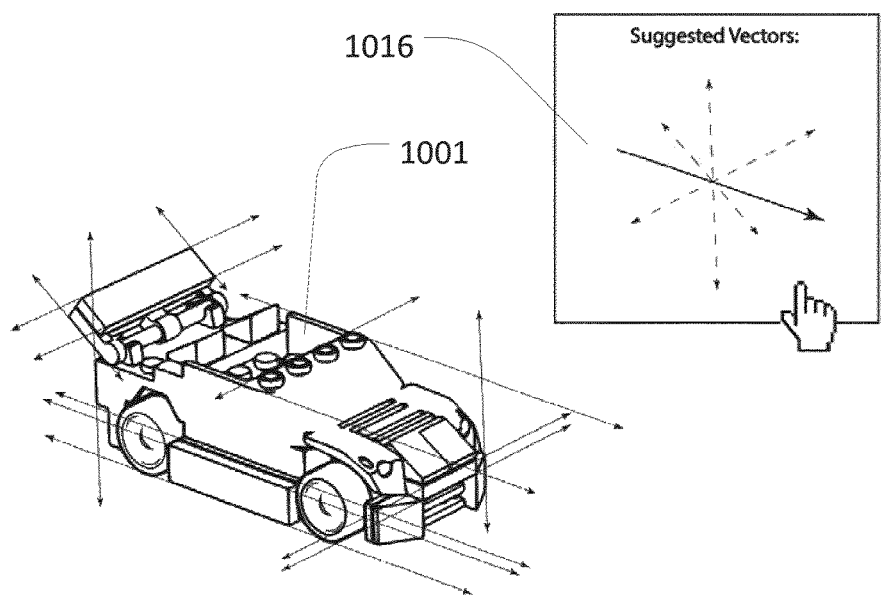
FIG. 10 illustrates an example of a virtual object displayed in the display area of a computer where detected edges are indicated by arrows.

In subsequent step S904 the process detects edges of the virtual object, e.g. using a suitable edge detection method known per se in the art. FIG. 10 illustrates an example of a virtual object 1001 displayed in the display area of a computer where detected edges are indicated by arrows.

Still referring to FIG. 9, in subsequent step S905, the process determines a principle direction of motion of the created virtual object based on the detected edges. To this end, the process may detect one or more properties of the detected edges, e.g. one or more of the following properties:

- a position of the detected edges in 3D space relative to the virtual object,
- the orientation of the detected edges in 3D space relative to the virtual object,
- the length of the respective edges.

Alternatively or additionally, the process may detect other features from which a principle direction may be derived. Examples of such features include: edge vectors of toy construction elements, planes, planarity of ellipses, e.g. of wheels, grids defined by the positions of coupling members of the toy construction elements, etc. Based on one or more of the above properties, the process may determine one or more likely principle directions. For example, the process may determine the most likely principle direction to be the direction along which most of the detected edges are directed. In another embodiment, the process may determine the most likely principle direction not only based on the number of edges but also based on the sum of the lengths of the edges pointing into a given direction. In yet another embodiment, the process may also consider the positions of the edges, e.g. by weighting clusters of edges that are close to each other higher than edges that are spaced apart from each other.

The process may then select the determined most likely principle direction as the principle direction to be associated with the virtual object. Alternatively, the process may present a number of candidate directions to the user so as to allow a user to choose a principle direction among the identified candidate directions. FIG. 10 further illustrates a graphical user-interface element 1016 allowing a user to select one of a number of candidate directions.

In alternative embodiments, edge detection can also act as a 'manual override' selector. For example, the system may display the detected edges in a displayed representation of the virtual object and allow the user to select the edge that best represents the global direction of travel or another principle direction associated with the virtual object.

Once a global principle direction has been assigned to the virtual object, e.g. a global direction of travel, the global principle direction may be used to define a direction associated with one or more local attributes, e.g. a direction along which discharge elements are to be discharged.

It will be appreciated that a global direction axis may also be associated to a virtual object in other ways, e.g. during the scanning process. For example, a direction may be indicated on a turntable and the corresponding direction of the real-world object may be defined by the orientation of the real-world object relative to the turntable when positioned on the turntable. This direction may then be detected during the scanning process and assigned to the corresponding virtual object that is created based on the scanned real-world object.

Figure 11:
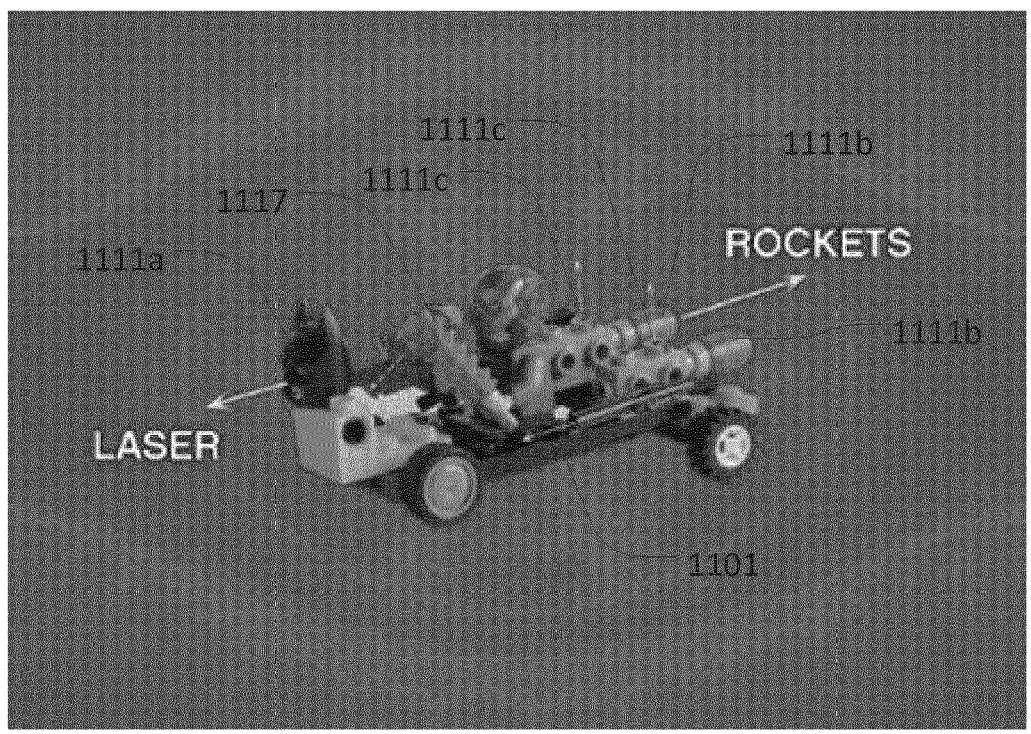
FIG. 11 illustrates examples of directional local attributes.

As mentioned above, some local attributes that are assigned to a selected part of the virtual object may have a direction associated with it. FIG. 11 illustrates examples of directional local attributes. In particular, FIG. 11 shows a virtual vehicle 1101 having a first part 1111a that has assigned a laser functionality, a pair of second parts 1111b that have assigned a rocket launcher functionality, and a pair of third parts 1111c that have assigned an exhaust pipe functionality. Moreover, a virtual character holding a tool 1117 is placed on a driver's seat of the vehicle, where the tool also has a direction of interaction associated with it. The laser functionality, the rocket launcher functionality and the exhaust pipe functionality may each have a discharge direction associated with them indicating the direction in which the respective discharge elements (i.e. the laser beam, the rockets, the exhaust gas, respectively) are discharged. These directions are indicated by arrows in FIG. 11.

The above functional attributes may have been assigned to the respective parts by any of the techniques described herein, e.g. based on a user-selection of a part of the virtual object, e.g. by selecting a color, a shape, a 3D geometry, a face, a polygon, a point etc. The direction associated with the respective functional attributes may be determined based on a property of the selected part, e.g. based on detected edges of the selected part and/or based on a principle surface normal or an average surface normal of the selected part. The determined direction may then be stored together with the attribute and associated with the corresponding part to which the directional attribute is assigned.

In some embodiments, the process may map all local attributes to a global principle direction associated with the virtual object, e.g. such that all discharge elements, e.g.

rockets, always fire forward relative to a principle direction of motion of the virtual object.

Figure 12:
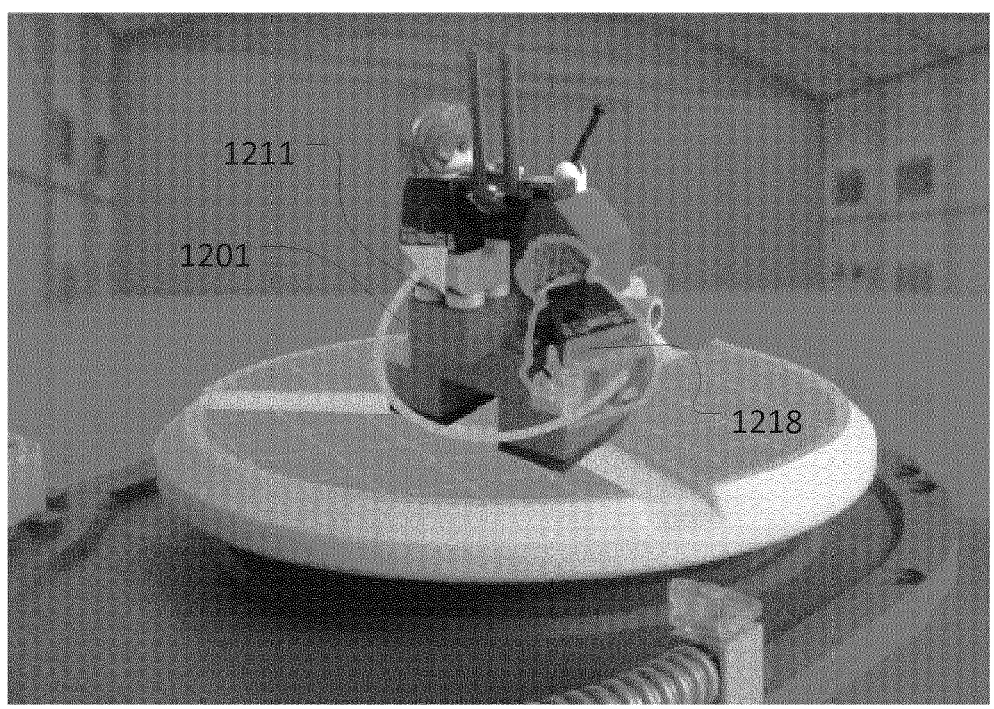
FIG. 12 illustrates another example of a process for a user-assisted selection of a part of a virtual model.

FIG. 12 illustrates another example of a process for a user-assisted selection of a part of a virtual model. According to this example, the process selects a part of the virtual object at which an interaction of the virtual object with another virtual object or with the virtual environment may take place. More specifically, in the example of FIG. 12, the user selects a ride position of a virtual object, in this case a virtual vehicle. Once a part of the virtual object is selected, the process assigns a "riding position" attribute to the selected part. The attribute may also have a direction associated with it, e.g. a direction of the posture of a virtual character when sitting at the ride position. The direction associated with the interaction attribute may be determined by a principle or average surface normal associated with the selected part. The user may select the part of the virtual object at which an interaction can take place by moving a pointer or cursor across a representation of the model. The process may show another virtual object interact with the virtual model at the parts indicated by the user and illustrates changes in the interaction as the user moves the cursor or pointer across the representation of the virtual object. For example, in the context of the ride position example illustrated in FIG. 12, the process may use surface normals at the respective locations on the surface of the virtual object to animate a virtual character 1218 'climbing' over the virtual object 1201 when defining a ride position of the virtual object. To this end, as the user moves a cursor or pointer over the virtual object, e.g. with a game controller, the corresponding local normal value is passed to the character animation routine.

Figure 13:
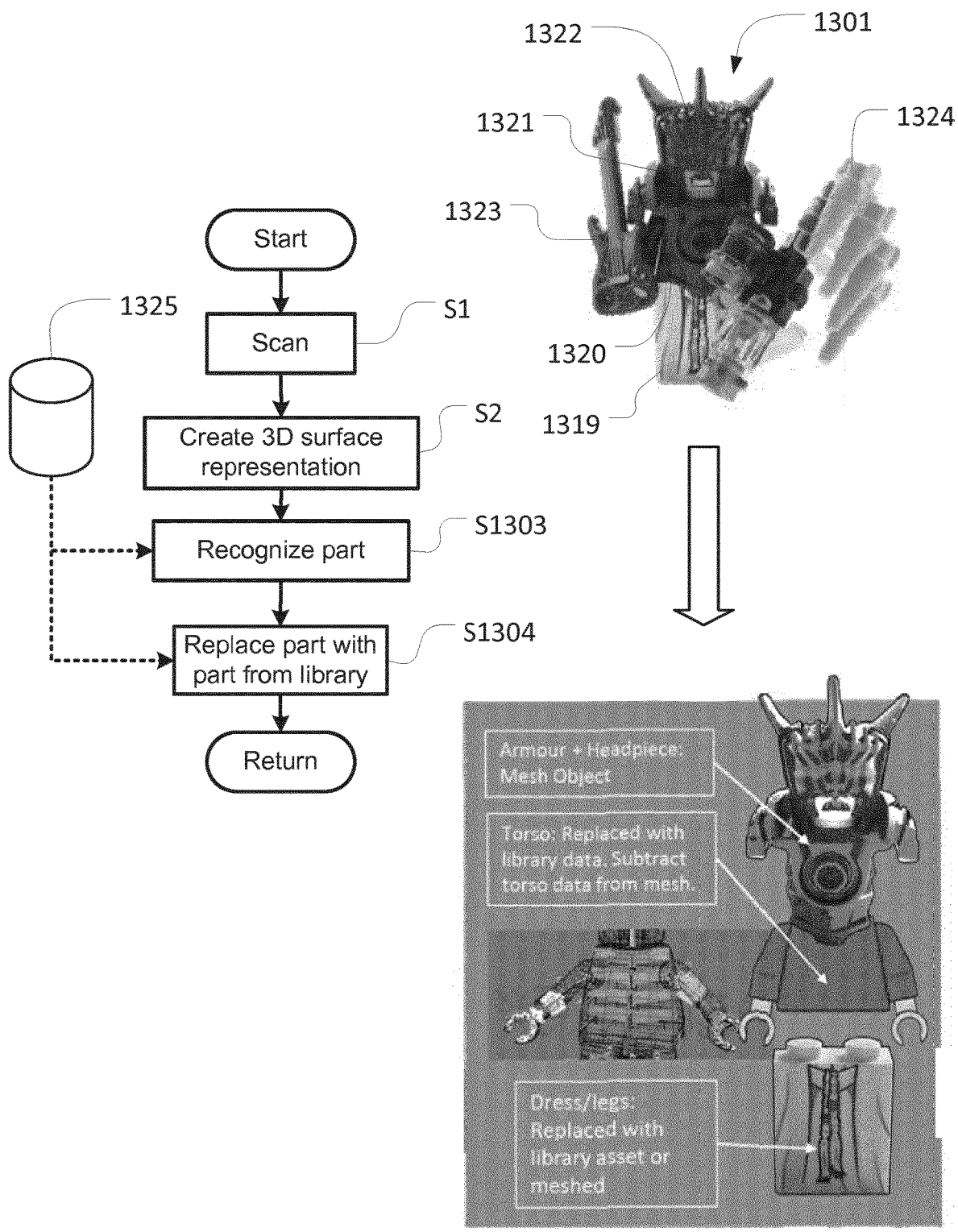
FIG. 13 illustrates another example of a process for creating a virtual object.

FIG. 13 illustrates another example of a process for creating a virtual object. In initial steps S1 and S2, the process obtains data indicative of the visual appearance of a toy construction model or of another real-world object and constructs a 3D digital representation of the toy construction model from the obtained data, e.g. from the digital images as described in connection with steps S1 and S2 of the embodiment of FIG. 2. The 3D representation may be a surface mesh representation or another suitable 3D representation. In the example illustrated in FIG. 13, the real-world object is a toy construction model in the form of a figurine 1301 assembled from a plurality of toy construction elements, e.g. elements resembling a leg portion 1319 of the figure, a torso portion 1320 of the figurine, a head portion 1321 of the figurine, an armoured helmet 1322 worn by the figurine, and a number of accessories 1323 and 1324 carried by the figurine. It will be appreciated that the process may also be performed based on another type of toy construction model constructing from other types of toy construction elements.

In step S1303, the process detects one or more toy construction elements of the toy construction model, e.g. based on a library 1325 of known toy construction elements. In particular, it has been realized that, for the purpose of creating a virtual object, it may not be necessary to recognize all toy construction elements of a model, but it may suffice to recognize certain types of toy construction elements. In particular, some parts of a virtual object are more important for a realistic animation of the characteristics of a virtual object than others. For example, the torso and/or leg parts of a figurine may be more important for a suitable animation of a movement of the virtual figurine than e.g. a helmet or an accessory. Similarly, the wheels of a car may be more important for an animation of the car than e.g. parts of the chassis.

Hence, by providing a library of selected known toy construction elements along with their characteristics, e.g. movement characteristics, allows for a creation of virtual objects that exhibit a rich behavior in a virtual environment while reducing the computational tasks associated with the recognition of multiple toy construction elements of a toy construction model. The library 1325 of known toy construction elements may have stored therein 3D representations of the known toy construction elements, e.g. in the form of a surface mesh representation, a voxel representation, a CAD representation or the like, e.g. as described in WO 2004/034333. The known toy construction elements may further be stored with one or more attributes associated with them, e.g. a color, a skeleton for facilitating the animation of movements, one or more animation routines, one or more other functional characteristics.

It will be appreciated that the recognition of a subset of the toy construction elements of a toy construction model may be performed using a recognition process known as such in the art, e.g. by matching a 3D models of the known toy construction elements to parts of the obtained 3D model of the toy construction model and/or by the use of neural networks or other adaptive, data-driven techniques, e.g. as described in WO 2016/075081.

In the example of FIG. 13, the process has detected the torso part 1320 of the figurine as a known torso part stored in the library of known torso parts. It will be appreciated that, alternatively or additionally, the process may recognise other known parts, e.g. the leg portion 1319.

In subsequent step S1304, the process replaces the part of the 3D representation of the toy construction model that has been recognized as corresponding to the known toy construction element with the corresponding 3D representation of the known toy construction element as retrieved from the library 1325. This replacement is schematically illustrated in the bottom right of FIG. 13.

The thus modified 3D representation generated in step S1304 may then be used as a 3D representation of a virtual object in a virtual environment. To this end the predefined attributes of the known toy construction element that has replaced a part of the 3D representation may be automatically assigned to the corresponding part of the 3D virtual object.

Nevertheless, it will be appreciated that the process may further allow a user-assisted assignment of attributes by one of the mechanisms described herein. Such attributes may be assigned to the part of the virtual object that has resulted from the replacement step 1304, as this part is now easily selectable by the user, e.g. as was described with reference to FIGS. 5 and 6 above. Alternatively or additionally, attributes may be assigned to other parts of the virtual object as selected by the user.

Examples of replacement of parts of the 3D representation by known elements include:
  A torso of a figurine is recognised and replaced. The underlying bone structure to animate the known part is also associated with the part that has been added to replace the original mesh. The user may then manually select the torso to assign further attributes, e.g. a 'Ninja' or 'Strongman' attribute, defining how the torso is animated to move. The same may be done for the legs, head etc.
  Wheels on a car or other vehicle are recognised and replaced. The rotational axis of the wheel is associated as an attribute with the known wheel; the user may define further attributes, e.g. the global behaviour of the car to define how the car drives and how much grip attribute the tyres are assigned.

A toy construction element with a graphic marker is recognised and replaced by a known element. As described above, directional information of the surface of the recognised part is also known. The user may then assign an attribute manually. For example assigning a water cannon attribute to an element with a graphic flame marker may result in hot water being sprayed that could melt ice in a computer game.

In some embodiments, the process automatically detects and replaces colors and/or graphic markers and allows a user to manually control an animation and display of features associated with the colors or markers via attributes.

This type of recognition and replacement may be performed independently of any recognition of toy construction elements. Unlike the embodiments described above, where color or markers are used as a selectable region to apply attributes, this embodiment uses a recognized marker as an auto-target for animation and/or a recognized color as an auto-target for visual effects. The choice of effects or animations may still be applied responsive to a user selection, either globally or locally. Examples of such embodiments include:

Graphic markers on a creature's eyes are recognized and the corresponding animation targets are overlaid on to the virtual object. If the user selects the global attribute 'angry monster', angry eye animations are displayed. Alternatively, the user could locally define that the left eye will be 'angry monster' and the right be 'cute girly monster'.

Colors on a creature are recognized and corresponding animation targets are overlaid over the regions. For example, the user can locally assign 'fur' display attribute to all green areas and green fur appears to grow out of the green regions. Globally the user could assign 'bee' to the whole object and the process would assign yellow and black 'fuzz' display attributes to the different colored regions.

Embodiments of the method described herein can be implemented by means of hardware comprising several distinct elements, and/or at least in part by means of a suitably programmed microprocessor.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A computer-implemented method for creating a virtual object, the method comprising:
    obtaining a digital representation of a visual appearance of a real-world object, the digital representation being created from data received from one or more sensor devices operable to capture radiation from the real-world object;
    creating a virtual object with a visual appearance based on the received digital representation;
    selecting a part of the virtual object; and
    assigning one or more local attributes to the selected part of the virtual object, the one or more local attributes being indicative of a functional capability of a part of the virtual object;
    wherein the assigned one or more local attributes has an associated attribute direction;
    wherein the method further comprises:
    determining a direction associated with the selected part of the virtual object; and
    assigning the determined direction as an attribute direction to the assigned one or more local attributes;
    wherein the assigned one or more local attributes are riding positions of the virtual character relative to the virtual object; and
    wherein the method further comprises:
    determining a surface normal of a surface of the virtual object at a selected riding position; and
    determining a riding posture of the virtual character based on the determined surface normal.

2. A method according to claim 1, wherein the obtained digital representation represents at least a surface geometry of the real-world object.

3. A method according to claim 2, wherein selecting a part of the virtual object comprises:
    detecting, based on the obtained digital representation, a predetermined feature of the virtual object; and
    selecting a part of the virtual object associated with the detected feature.

4. A method according to claim 3, wherein selecting a part of the virtual object comprises:
    receiving a user input indicative of a user selected part of the virtual object;
    detecting, based on the user selected part, a predetermined feature of the virtual object.

5. A method according to claim 4, wherein selecting a part of the virtual object comprises:
    detecting, based on the obtained digital representation, one or more features of the virtual object;
    receiving a user input indicative of a user selection of one of the detected one or more features; and
    selecting a part of the virtual object responsive to the user selection.

6. A method according to claim 5, wherein selecting a part of the virtual object comprises receiving a user input indicative of a user selected part of the virtual object.

7. A method according to claim 6, wherein the user input is indicative of a user selected location on a surface of the virtual object; and wherein the method comprises:
    determining a visible property of the virtual object associated with the user selected location; and
    determining a part of the virtual object as a part of the virtual object having a visible property in common with the determined visible property associated with the user selected location.

8. A method according to claim 1, wherein assigning the one or more local attributes to the selected part of the virtual object comprises:
    detecting one or more properties of the selected part and/or of one or more other parts of the virtual object, different from the selected part; and
    selecting the one or more local attributes based on the detected one or more properties.

9. A method according to claim 8, wherein the one or more other parts are parts in a predetermined spatial relationship with the selected part.

10. A method according to claim 1, further comprising controlling the virtual object in a computer-generated virtual environment to have a behaviour based on the one or more assigned local attributes.

11. A data processing system configured to perform the steps of the method according to claim 1.

12. A computer program product comprising program code means adapted to cause, when executed on a data processing system, said data processing system to perform the steps of the method according to claim 1.

13. A toy construction system comprising:
a data processing system as defined in claim 11; and
a plurality of toy construction elements, each of said plurality of toy construction elements comprising one or more coupling members configured for detachably interconnecting the plurality of toy construction elements with each other so as to form a real-world object.

14. A method according to claim 1, wherein the assigned one or more local attributes are indicative of a functional capability chosen from:
a capability of a part of the virtual object to be moved relative to the remainder of the virtual object or relative to another part of the virtual object;
a capability of a part of the virtual object to discharge one or more virtual discharge elements; and
a capability of a part of the virtual object to interact with other virtual objects.

15. A computer-implemented method for creating a virtual object, the method comprising:
obtaining a digital representation of a visual appearance of a real-world object, the digital representation being created from data received from one or more sensor devices operable to capture radiation from the real-world object;
creating a virtual object with a visual appearance based on the received digital representation;
selecting a part of the virtual object; and
assigning one or more local attributes to the selected part of the virtual object, the one or more local attributes being indicative of a functional capability of a part of the virtual object;
wherein the digital representation comprises a plurality of geometric elements, such as surface elements or volume elements, representative of a surface model or a volume model of the real-world object, wherein selecting a part of the virtual object comprises:
recognising a part of the virtual object as a representation of a recognised one of a plurality of predetermined parts, the recognised part corresponding to a subset of said plurality of geometric elements;
retrieving a stored digital representation of the recognised predetermined part from a library of stored digital representations of the plurality of predetermined parts; wherein one or more of the stored digital representations of the predetermined parts have associated with them the assigned one or more local attributes; and
replacing the subset of geometric elements with the retrieved digital representation of the recognised predetermined part.

16. A computer-implemented method for creating a virtual object, the method comprising:
obtaining a digital representation of a real-world object, the digital representation representing a visual appearance of a shape of the real-world object;
detecting, from the received digital representation, one or more geometric features of the real-world object;
creating a virtual object representing the real-world object; and
assigning, based on the detected one or more geometric features, a direction of travel to the created virtual object.

17. A computer-implemented method for creating a virtual object, the method comprising:
obtaining a digital representation of a visual appearance of a real-world object, the digital representation being created from data received from one or more sensor devices operable to capture radiation from the real-world object;
creating a virtual object with a visual appearance based on the received digital representation;
selecting a part of the virtual object; and
determining a direction associated with the selected part of the virtual object; wherein determining the direction includes detecting a geometric feature of the selected part and determine the direction based on the detected geometric feature,
assigning one or more local attributes to the selected part of the virtual object, the one or more local attributes being indicative of a functional capability of a part of the virtual object, wherein the assigned one or more local attributes has an associated attribute direction, and
assigning the determined direction as an attribute direction to the assigned one or more local attributes.

* * * * *